US005398186A

United States Patent [19]

Nakhla

[11] Patent Number: 5,398,186

[45] Date of Patent: Mar. 14, 1995

[54] ALTERNATE DESTINATION PREDICTOR FOR AIRCRAFT

[75] Inventor: Nader N. I. Nakhla, Seattle, Wash.

[73] Assignee: The Boeing Company, Seattle, Wash.

[21] Appl. No.: 810,275

[22] Filed: Dec. 17, 1991

[51] Int. Cl.[6] .............................................. G06F 15/50

[52] U.S. Cl. .................................... 364/428; 364/433; 364/441; 364/442; 364/446; 244/183

[58] Field of Search ............... 364/428, 430, 433, 434, 364/439, 441, 442, 443, 444, 446, 448, 449, 458; 244/180, 181, 182, 183, 186, 188

[56] References Cited

U.S. PATENT DOCUMENTS

| | | | |
|---|---|---|---|
| 3,140,391 | 7/1964 | Daspit | 364/441 |
| 3,406,280 | 10/1968 | Vago | 364/444 |
| 3,413,597 | 11/1968 | Crow | 364/444 X |
| 3,612,837 | 10/1971 | Brandau | 364/442 X |
| 4,086,632 | 4/1978 | Lions | 364/444 |
| 4,220,994 | 9/1980 | Hendrickson | 364/456 |
| 4,253,150 | 2/1981 | Scovill | 364/449 |
| 4,312,041 | 1/1982 | DeJonge | 364/442 |
| 4,413,322 | 11/1983 | Foster et al. | 364/448 |
| 4,521,857 | 6/1985 | Reynolds, III | 364/439 |
| 4,538,229 | 8/1985 | Baltzer et al. | 364/428 |
| 4,642,775 | 2/1987 | Cline et al. | 364/443 |
| 4,706,198 | 11/1987 | Thurman | 364/439 |
| 4,774,670 | 9/1988 | Palmieri | 364/446 |
| 4,796,190 | 1/1989 | Cummings | 364/449 |
| 4,896,154 | 1/1990 | Factor et al. | 364/443 X |
| 4,974,170 | 11/1990 | Bouve et al. | 364/444 X |
| 4,999,780 | 3/1991 | Mitchell | 364/428 |
| 5,121,325 | 6/1992 | DeJonge | 364/442 |
| 5,142,480 | 8/1992 | Morrow | 364/433 X |
| 5,265,024 | 11/1993 | Crabill et al. | 364/443 |

*Primary Examiner*—Gary Chin
*Assistant Examiner*—Collin W. Park
*Attorney, Agent, or Firm*—Chistensen, O'Connor, Johnson & Kindness

[57] ABSTRACT

Disclosed is a flight management computer modification that provides a pilot of an aircraft with a list of alternate landing destinations at which he can land the aircraft in case of an emergency on board or due to some reason why he cannot land at an intended destination. Each of the alternate landing destinations is displayed with data regarding the distance between the aircraft's present position and each of the alternate destinations, the estimated time of arrival to fly the aircraft to each of the alternate destinations and an estimate of the fuel remaining on board the aircraft if the aircraft were to land at the alternate destinations. The data allows the pilot to compare the benefits of landing at one of the alternate destinations versus landing at another. The dam is calculated assuming a direct flight from the aircraft's present position to the alternate as well as assuming a missed approach at the intended destination and a flight from the intended destination to the alternate landing destination. The computational time required to produce the data for the pilot is minimized by increasing the size of the integration steps used by the flight management computer to calculate estimated time of arrival and fuel remaining and by using the flight management computer's precalculated values for optimum climb and descent angles.

8 Claims, 11 Drawing Sheets

ALTERNATE DESTINATION PREDICTOR FOR AIRCRAFT

FIELD OF THE INVENTION

The present invention relates to flight management systems for aircraft and, more particularly, to flight management systems that provide emergency landing information to a pilot.

BACKGROUND OF THE INVENTION

Currently, there is no standard practice among airline companies regarding how to provide the pilot of an aircraft with information about alternate landing destinations, if some reason, such as bad weather or an emergency on board, prevents a landing at the intended destination. An approach taken by some airlines is to provide the pilot with a list of alternate destinations before takeoff or during the flight, via data uplink capabilities, if available. Typically the list includes several "en route" destinations that lie between the point of departure and the intended destination, and several "missed approach" destinations that are located near the intended destination. En route destinations are for use when an emergency, such as a severe illness on board the aircraft, requires a deviation from the intended route prior to arriving at the intended destination. Missed approach destinations are for use when the airplane arrives at the intended destination but is prevented from landing for some reason, such as a stalled aircraft on the runway.

For various reasons, the list of alternate landing destinations provided by an airline is often inadequate to present the pilot with a meaningful choice of where to land the aircraft during an emergency situation, especially if no data uplink is available. First, the alternate landing destinations included on the list are often selected because the airline has support staff located there and not because the destinations are nearby the intended destination. Second, the list, once written, remains unchanged despite conditions that may vary during flight and, therefore, change the desirability of landing at a particular alternate destination. For example, if the aircraft were to encounter a strong head wind that caused an increase in the amount of fuel used, some of the alternate destinations included on the list may be too far to reach safely. Further, because it is impossible to predict where on the route to the intended destination an emergency will occur, the en route list might provide a pilot with an alternate destination that is not the most desirable based on all available alternate destinations because the most desirable alternate destination is not on the list. Finally, the list of alternate destinations does not provide a pilot with dam sufficient for him to make a decision why one alternate landing destination is a better choice than another.

Another approach used by some airlines is to not give the pilot any alternate destination information. If a pilot experiences an emergency en route, he is directed to contact air traffic control to determine the nearest alternate destination. The problem with this approach is that the safety of several hundred passengers is placed in the hands of an air traffic controller being able to think clearly where to direct the aircraft in an emergency situation. Also, this approach does not provide the pilot with any data regarding how long it will take to fly to the alternate destination and how much fuel will be used.

Thus, there exists a need for an alternate destination predictor for aircraft that provides a greatly increased data base of available alternate landing destinations and provides a pilot with sufficient information regarding a deviation from his present route to each of several available alternates so that the pilot can make a better informed decision regarding a route change. The present invention is directed to providing such an alternate destination predictor and, thus, greater autonomy to aircraft containing the predictor.

SUMMARY OF THE INVENTION

The present invention is a flight management computer (FMC) system modification that provides a pilot with a choice of several alternate landing destinations based on a navigational data base of available landing sites stored in the memory of the FMC. For each alternate landing destination, the FMC system modification advises the pilot of the distance required to fly to the alternate destination, the expected time of time of arrival and the amount of fuel remaining upon arrival at the alternate destination. This allows the pilot to intelligently decide which alternate landing destinations to choose during an emergency.

In accordance with other aspects of this invention, the FMC system modification also allows a pilot to input additional landing sites not included in the FMC landing site navigational database, based on the pilot's experience regarding where an aircraft can be landed—an abandoned military base, for example. In this case, the FMC system modification advises the pilot of the distance required to fly to the alternate destination(s) input by the pilot, the expected time of arrival and the fuel remaining upon arrival. Also, preferably, the FMC system modification is capable of automatically displaying a list of the nearest alternate destinations from any given point along the original flight plan to the intended destination upon pilot selection.

In accordance with further aspects of this invention, the FMC system modification also advises the pilot of the distance to go and an optimum altitude at which to fly to an alternate destination. Further, the FMC system modification allows a pilot to alter the parameters used to compute the advisory data based on air traffic control information or personal knowledge about flying to the alternate destinations, such as encountering a head wind or flying around a restricted zone, thus lengthening the distance to the alternate. Furthermore, preferably, an FMC system modification according to the present invention provides advisory predictions based either on a direct flight to the alternate destination while en route or direct flight after a missed approach at the intended destination.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
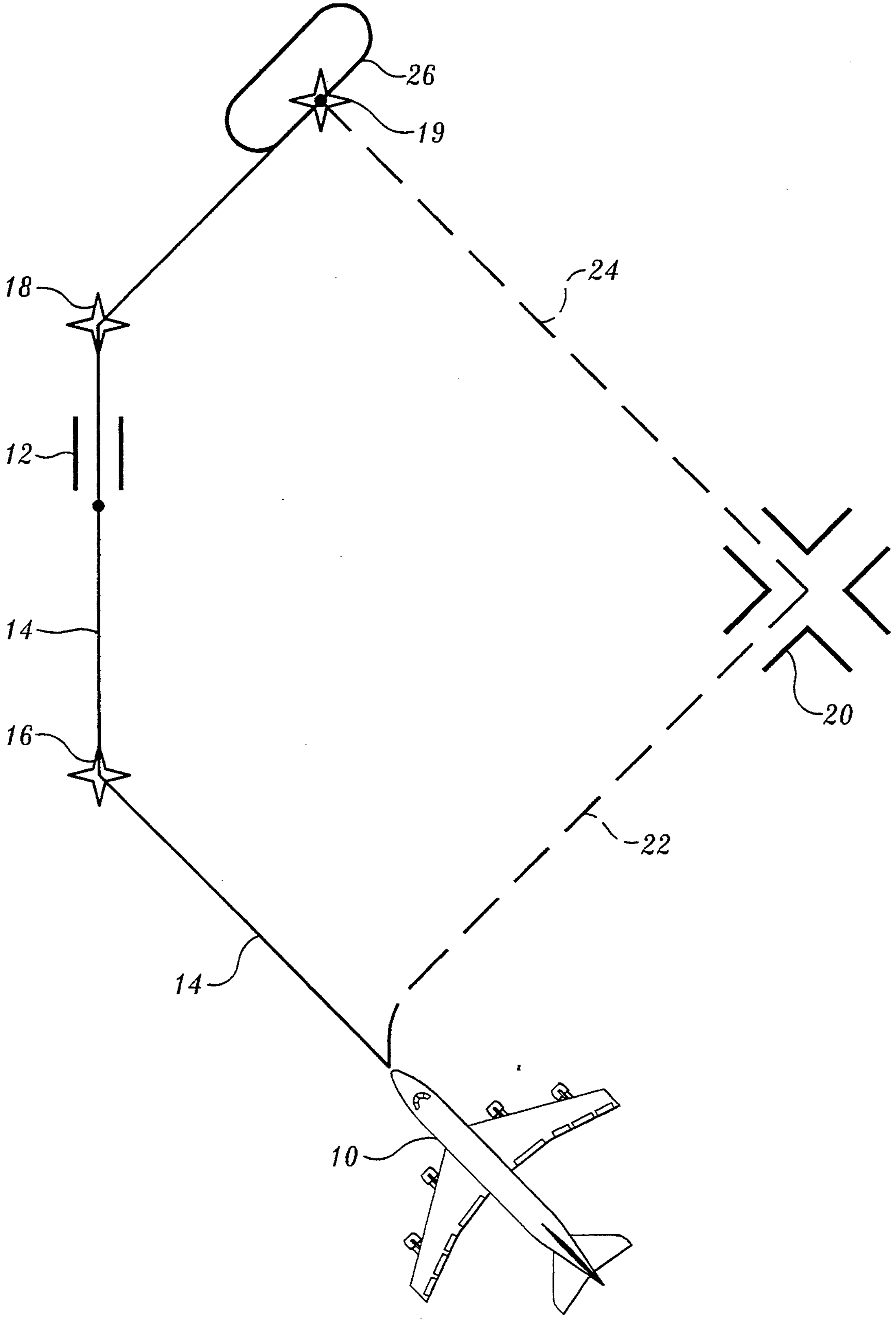
FIG. 1 is a diagram showing a direct and missed approach flight path to an alternate destination.
Figure 2:
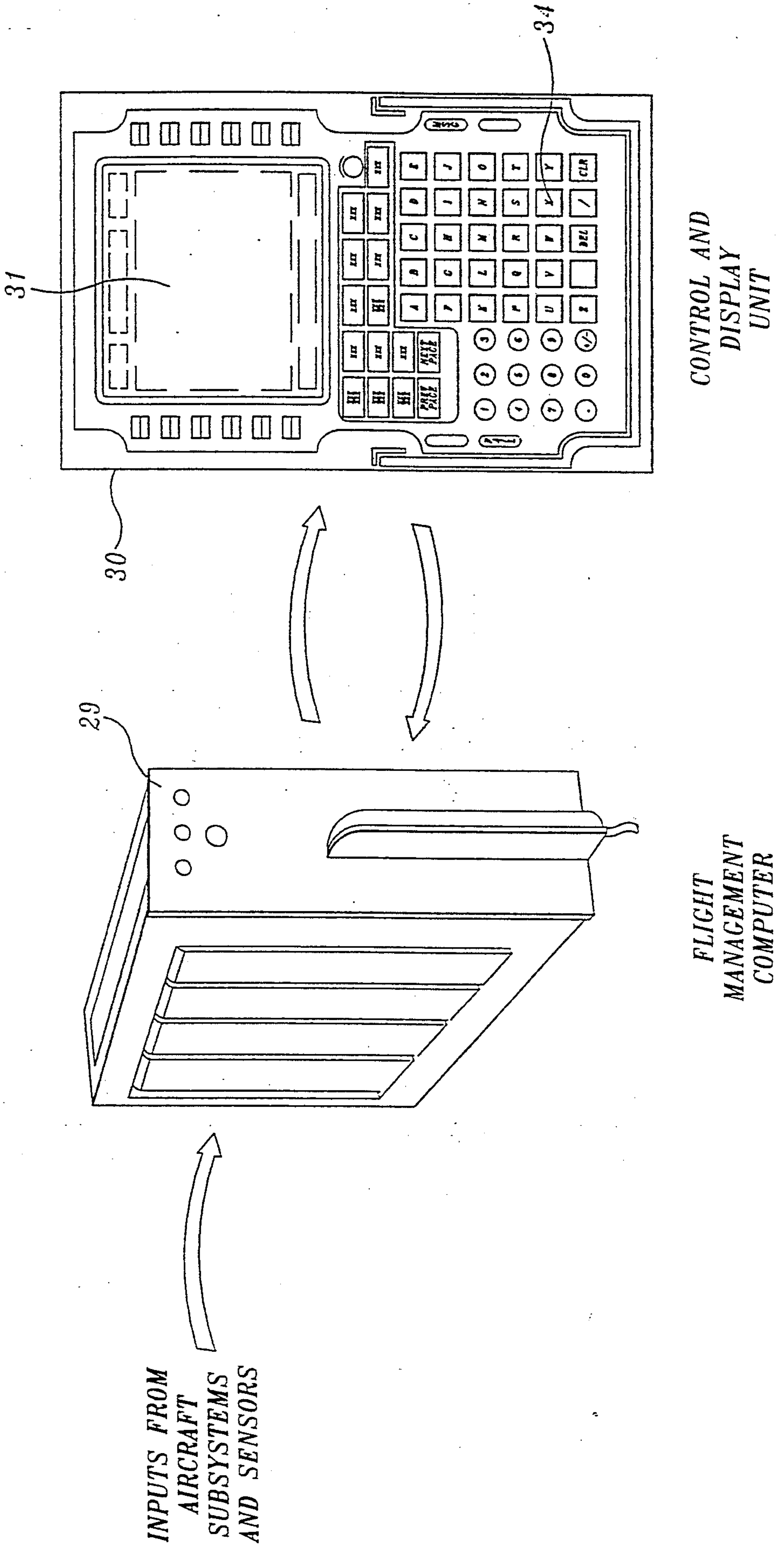
FIG. 2 is a pictorial diagram of a flight management computer (FMC) system.

FIG. 1 is a diagram showing an aircraft 10 en route to an intended destination airport 12. The aircraft autopilot follows a predetermined flight plan 14 stored in the memory of a flight management computer (FMC) from its present position to the destination airport. As shown in FIG. 2, the FMC system of an aircraft generally comprises an FMC 29 and a control and display unit (CDU) 30. The FMC receives data input from a variety of aircraft subsystems and sensors all well known in the aircraft art. The CDU provides a pilot interface to the FMC and includes a display 31 and a keyboard 34. Since FMCs and CDUs are well known in the aircraft art, they are not further described here except as required for an understanding of the present invention.

Returning to FIG. 1, a pair of waypoints 16 and 18 transmit radio signals to the aircraft 10, which assist the FMC in navigating the aircraft to the intended destination airport 12. If for some reason such as bad weather, engine failure, or a medical emergency, etc., the aircraft 10 is unable to land at the intended destination 12, the FMC system according to the present invention provides the pilot with information about one or more alternate landing destinations 20. More specifically, as will be better understood from the following description, the present invention modifies the FMC system to compute and display the data necessary for a pilot to intelligently evaluate the feasibility of trying to land at an alternate destination 20. This data includes the distance to go, estimated time of arrival and fuel remaining if the aircraft were to land at the alternate destination. As more fully described below, this data is computed for both a direct approach route 22 and a missed approach route 24. The direct approach route 22 extends from the aircraft's present position. The missed approach route 24 extends from the last waypoint 19 of the missed approach procedure at the destination airport plus the distance between the present position to the last waypoint of the missed approach procedure. As shown, the last waypoint may be associated with a holding pattern 26.

A pilot follows a missed approach procedure (typically included in the flight plan to the intended destination) if for some reason the aircraft was unable to land at the intended destination, such as another aircraft on the runway, heavy fog, etc. When this occurs, the aircraft is routed over waypoint 18 and into a holding pattern 26. During the missed approach, distance to go, estimated time of arrival and fuel remaining data are computed assuming the aircraft flies from its present position on the flight plan 14, to the intended destination 12 and along the missed approach route including a single pass around the holding pattern 26, and a direct flight to the alternate destination 20. This missed approach data allows the pilot to intelligently determine if he can land the aircraft 10 at the alternate destination 20 after a missed approach at the intended destination and, if so, by what margin of safety.

Figure 3:
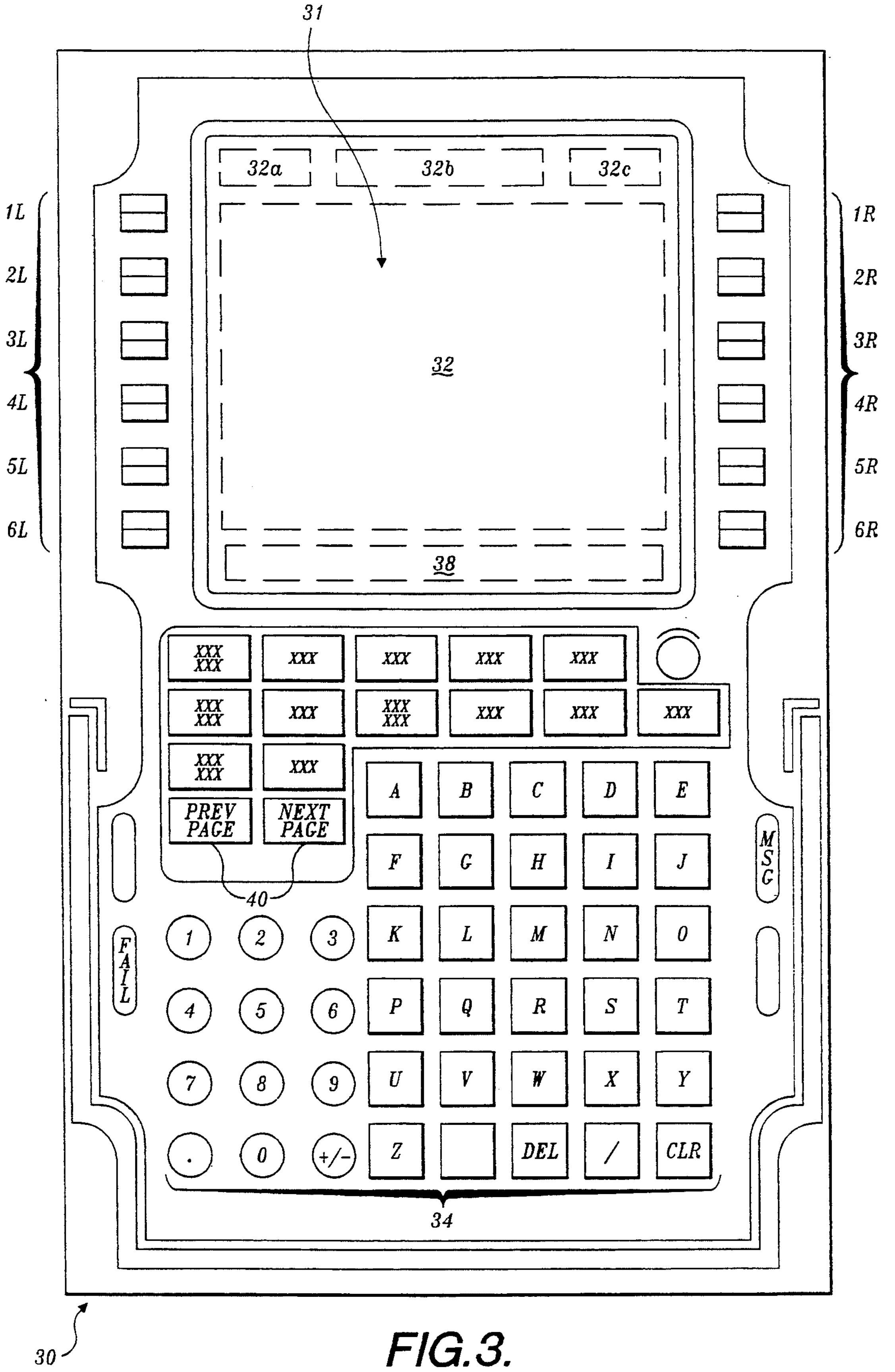
FIG. 3 is a pictorial diagram of the face of a control display unit (CDU)

FIG. 3 is a pictorial diagram of the face of a typical control and display unit (CDU) 30. As shown in FIG. 2 and noted above, the CDU is part of the FMC system that, among other things, performs aircraft navigation functions. Although the present invention uses a CDU to display the alternate destination data, those skilled in the art will recognize that other types of aircraft computer displays also could be used.

The display 31 of the CDU 30 illustrated in FIG. 3 includes a central area 32 in which data is displayed to the pilot. Above the central area 32 is an area 32*a* in which the data status block is displayed, an area 32*b* in which the title of the screen is displayed and an area 32*c* in which the page number of the screen is displayed.

One set of keys 1L–6L is disposed on the left side of display area 32 and a second set of keys 1R–6R is disposed on the right side. A pilot enters or selects a particular line of data within the central display area 32 by keying the data using a set of alphanumeric keys 34. Data entered by the pilot is first displayed in a scratch pad area 38 located beneath the central display area 32 before being entered into a particular line of the central display area 32 using the keys 1L–6L or 1R–6R. A pair of keys 40 denoted NEXT PAGE and PREV PAGE allows the pilot to view the next screen of dam or to review a previous screen of data displayed on the CDU 30.

Figure 4:
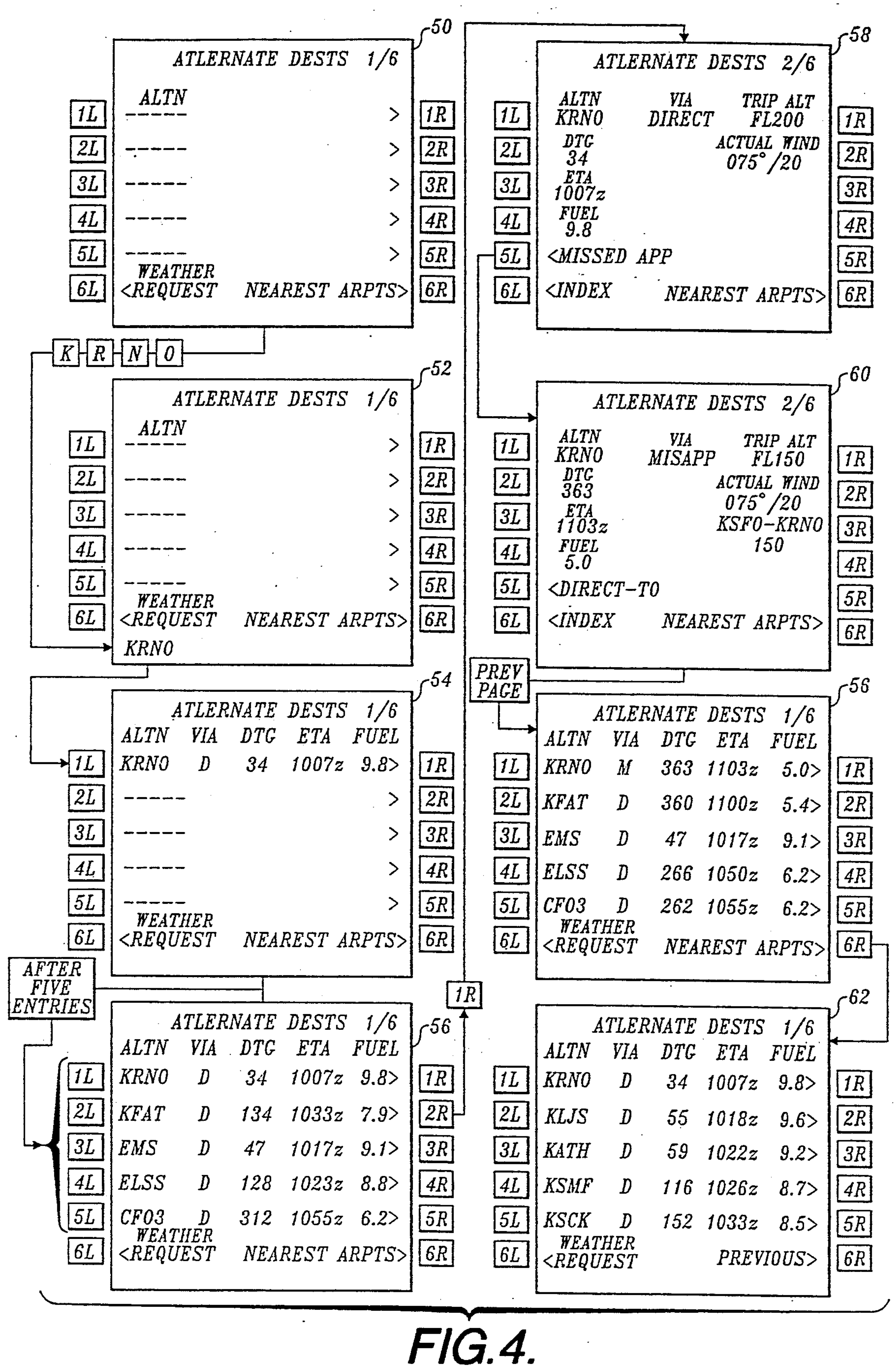
FIG. 4 is a diagram showing the type of alternate destination data generated by the present invention and displayed on a CDU.

FIG. 4 is an example of the order in which a series of screens might be displayed to the pilot of an aircraft whose FMC system has been modified in accordance with this invention. Upon entering the alternate destination mode, the pilot is presented with a first screen 50 that displays ALTERNATE DESTS in the title area 32*b* to alert the pilot that the FMC system is operating in the alternate destination mode. Screen 50 allows the pilot to enter the call letters of an alternate landing destination where he knows he can land the aircraft in case of an emergency.

The selection can be made based on airline-provided information or on the pilot's previously acquired knowledge or knowledge derived from route maps. In the example shown in FIG. 4, the pilot enters the letters KRNO using the alphanumeric character keys 34 on the CDU to signify an airport at Reno, Nev. As they are entered, the letters first appear in the scratch pad area 38 as shown in a second screen 52. The pilot then transfers the airport data code displayed in the scratch pad area to a particular line of the CDU by pressing the left key next to the line where the data is to be entered—1L, for example. After a line selection is made by the pilot, the CDU displays the airport code at the left of the selected lines followed by a series of information in spaced-apart column positions. The column headings are: ALTN (the alternate destination airport code), VIA (to tell the pilot whether the data is computed assuming a direct route to the alternate or assuming a missed approach at the intended destination), DTG (the distance between the aircraft's present position and the alternate destination), ETA (estimated time of arrival at the alternate destination), and FUEL (the amount of fuel remaining, in hundreds of pounds, if the aircraft were to land at the alternate destination). See the third screen 54 shown in FIG. 4.

A weather request option is activated by the pilot by pressing a toggle key 6L. When this key is toggled to a weather request state, a signal is sent from the aircraft to a ground support station requesting that information about the weather conditions at the displayed alternate airports be beamed to the aircraft. The weather conditions are displayed on an individual page associated with each alternate destination and described below. After the first pilot-entered call letters are transmitted to the central area 32 by activating one of the left keys and the associated VIA, DTG, ETA, and FUEL data is displayed, the next alternate landing destination is keyed in by the pilot and the foregoing procedure is repeated. Up to five (5) alternate landing destinations can be displayed in the illustrated embodiment of this invention, The fourth screen 56 of FIG. 4 is an example of what is displayed after the pilot has entered five alternate landing destinations using the method described above. The alternate landing destinations entered by the pilot need not be airports; they could comprise waypoints or navigational aids where the pilot knows from experience that a usable landing strip exists. Such landing strips could comprise private airports, military airports or airports where the pilot's airline company does not have support staff located. The only restriction on the type of alternate destination that can be entered by the pilot is that the location of the alternate must be included with the FMC system navigational data base. The summary page on which information on the five (or less) alternate landing destinations is displayed is designated 1/6. As next described, pages 2/6 through 6/6 are individually related to each of the chosen alternate destinations.

A pilot can obtain more information about a particular alternate destination or can alter the data provided by the flight management computer by selecting one of the keys 1R–5R on the right hand side of the CDU. For example, selecting key 1R brings up an individual screen 58 for the alternate destination—Reno, Nev. (KRNO)—aligned with that key. The individual screen 58, which bears the page number 2/6, shows the call letters of the alternate destination (ALTN), the distance to go (DTG), the estimated time of arrival (ETA) and fuel remaining upon arrival of the alternate destination (FUEL), plus additional items. The additional items are the optimum trip altitude at which to fly to the alternate destination (TRIP ALT), an estimation of the wind speed the aircraft is likely to incur en route and the direction of wind (ACTUAL WIND).

In the direct case, the distance to go (DTG) is computed using the great circle distance between the aircraft's present position and the latitude and longitude of the alternate destination as stored in the navigational data base of the FMC. If the pilot knows that the distance to the alternate destination is greater than the great circle distance, he may enter the greater distance using the alphanumeric keys located on the CDU and by pressing key 2L. In this case, the pilot-entered distance is used to compute the estimated time of arrival and fuel remaining. Typically, a pilot would enter a distance greater than the great circle distance if FAA regulations prohibit an aircraft from flying a direct route from the aircraft's present position to the alternate destination or a direct route from the intended destination to the alternate in the case of a missed approach. This would occur, for example, if the direct route passed through prohibited airspace, such as over a military base, the U.S. Capitol or the White House.

In addition to changing the distance to go, on screen 58, the pilot is also given the option of changing the call letters of the airport. For example, a pilot can enter a new airport using the alphanumeric keys and scratchpad as described above and pressing key 1L. Upon entering a new alternate landing destination from screen 58, the pilot will be shown an individual screen for the new alternate assuming a direct approach. Finally, the pilot can also change the wind data using key 2R and the trip altitude using key 1R, if the pilot knows that local regulations prohibit flying at the computer determined trip altitude.

By default, the data shown on the fifth screen 58 is computed assuming a direct route from the aircraft's present position to the alternate destination. Alternatively, if the pilot depresses key 5L, the data to the alternate destination is calculated assuming a missed approach at the intended destination. Key 5L on the individual alternate destination screens (pages 2/6 through 6/6) constitutes a toggle key that shifts between missed approach (MISSED APP) and direct to alternate (DIRECT-TO). When the missed approach key is toggled to the MISSED APP state, page 2/6 shifts to the sixth screen 60 shown in FIG. 4. This screen shows the pilot the code for the alternate destination (ALTN), the distance to go (DTG), estimated time of arrival (ETA), fuel remaining upon arrival at the alternate (FUEL) and the optimum trip altitude (TRIP ALT) to the alternate destination assuming a missed approach at the intended destination. The wind magnitude and direction likely to be encountered en route (ACTUAL WIND). Additionally, the pilot is also shown the distance between the intended destination and the alternate destination as KSFO (San Francisco) to KRNO (Reno), 150 nautical miles. As described above, in the missed approach mode, the distance to go is computed as the distance between the aircraft's present position and the last waypoint in the missed approach procedure, via the flight plan, plus great circle distance from the last waypoint of the missed approach procedure of the intended destination to the alternate destination including the distance of a single pass around the holding pattern at the missed approach airport. If the pilot presses the previous page key on the CDU panel shown in FIG. 3, the screen 56 that summarizes the data for all the alternate destinations is displayed (pg 1/6). If the pilot presses the next page key, the individual page for the next airport is displayed. An index key 6L is provided in each of the individual pages 2/6–6/6 that enables the pilot to leave the individual alternate destination page and return to the summary page (1/6).

On the missed approach page 60, the pilot has the option of altering the alternate landing destination using key 1L, the trip altitude using key 1R, the wind conditions using key 2R and the distance between the intended destination and the alternate destination using key 3R.

A "nearest airports" key 6R is also provided on all display pages. Upon selecting this key, the five airports nearest to the aircraft's present position are displayed. More specifically, when the nearest airports key is pressed, a search is performed in the FMC navigational data base to determine the five nearest airports. By default, the choice is made based on a direct route to each airport in the data bases. If desired, the pilot can see the data for each selected airport assuming a missed approach by selecting the individual screens associated with the selected airports and proceed in the manner described above. When the pilot selects the nearest airports option, any alternate destinations previously entered by the pilot are stored in a memory within the flight management computer. They and all entries made on their respective pages are recalled by pressing the "previous" key 6R. Thus, key 6R is a toggle key that toggles between a nearest airports (NEAREST ARPTS) state and a pilot-entered airports (PREVIOUS) state.

As will be readily appreciated from the foregoing description, the invention provides enough information about alternate destinations for a pilot to make an intelligent decision about which destination should be used for a landing in view of the existing situation. For example, if a passenger on board is having a heart attack, the pilot may choose the alternate destination having the earliest estimated time of arrival. If the pilot is running out of fuel, the pilot will probably choose the airport having the greatest estimated fuel remaining. As will be better understood from the following description, to minimize the computation time required by the present invention to three-five seconds per alternate destination, the displayed information is calculated using methods of lesser accuracies ($\pm 1\%$) than are normally used in the FMC.

Figure 5:
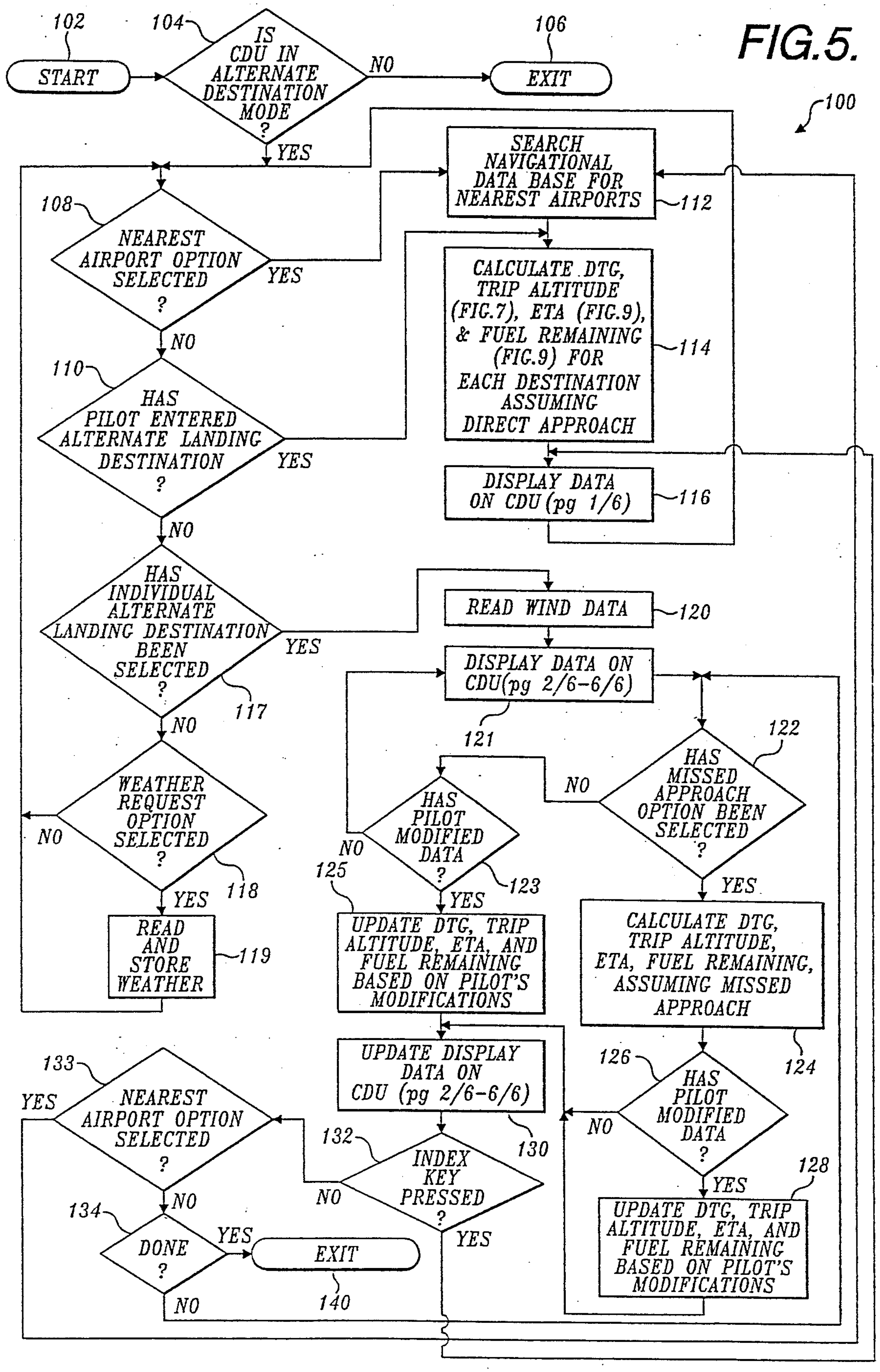
FIG. 5 is a flow diagram showing how the alternate destination on data shown in FIG. 4 is generated.

FIG. 5 is a flow chart showing the major steps of a program 100 for displaying alternate destination data to a pilot according to the present invention. While the program could function as a stand-alone program, preferably it is integrated into an FMC program. The program 100 begins at a start block 102 and proceeds to a decision block 104, wherein a test is made to determine if the pilot has selected the alternate destination function of the FMC. If the answer to the test is no, the program exits at a block 106. If the FMC is operating in the alternate destination mode, the program proceeds to a decision block 108, wherein a test is made to determine if the pilot has selected the nearest airport option. If the pilot has not selected the nearest airport option, the program proceeds to a decision block 110, wherein a test is made to determine if the pilot has entered an alternate landing destination. If the answer to this test is no, a test is made in decision block 117 to determine if an individual page for an alternate landing destination has been selected. If an individual page selection has not been made, a test is made in decision block 118 to determine if the weather request option has been selected. If the weather option has been selected, the program reads and stores weather information in the FMC memory. Thereafter, or if the weather request option has not been selected, the program loops back to decision block 108. The program remains in this loop until the pilot enters an alternate landing destination, selects the nearest airport option or selects an individual alternate landing destination.

If the nearest airport option is selected by the pilot, the program proceeds from decision block 108 to a block 112, wherein the navigational data base on board the aircraft is searched for the alternate landing destinations nearest to the aircraft's present position, as will be described below in connection with FIG. 11. After the five nearest landing destinations have been found in the database, the program proceeds to a block 114, wherein the distance to go, trip altitude, ETA and fuel remaining are calculated for each of the alternate landing destinations assuming a direct route from the aircraft's present position to each of the alternate destinations.

If the pilot does not select the nearest airports option but instead enters an alternate landing destination, during the next pass through decision block 110, the program proceeds to the block 114, wherein the previously described data is computed for the alternate landing destination entered by the pilot. As described above, in addition to airports, alternate landing destinations can include navigational aids and waypoints where the pilot knows a landing strip of suitable length exists. If the navigational aid or waypoint is not included in the FMC navigational data base on board the aircraft, no associated DTG, ETA or FUEL data will be displayed.

After block 114, the program proceeds to a block 116, wherein the summary page 1/6 is displayed on the CDU as described above and shown in FIG. 3. In the case of a pilot-entered alternate landing destination, the data associated with the pilot entry is displayed on the selected line (1L through 5L). In the case of a nearest airport pilot entry, data is displayed for the five nearest airports. If the pilot has selected an individual landing site, the program proceeds to a block 120, wherein the program reads stored the wind data en route to the alternate landing destination. After block 120, the data is displayed on the CDU (pages 2/6–6/6) in a block 121. After block 121, the program determines if the missed approach key has been pressed, block 122. If the pilot has not selected the missed approach option, a test is made, decision block 123, to determine if the pilot has modified the data computed by the FMC. If so, the DTG, trip altitude, ETA and fuel remaining at landing (FUEL) calculations are updated, block 125, before the data is displayed to the pilot in a block 130. If the pilot has not altered the data, the program loops back to block 121.

If the pilot has selected the missed approach option, the program calculates the distance to go, trip altitude, estimated time of arrival, and fuel remaining, block 124. After block 124, a test is made to determine if the pilot has altered the data computed by the FMC, block 126. If so, the DTG, trip altitude, ETA and fuel remaining (FUEL) are recalculated, block 128, before being displayed to the pilot, block 130. Finally, after block 130, a test is made, decision block 132, to determine if the pilot wishes to display the summary page. If the index key is pressed, the program proceeds to block 116. If the index key is not pressed, a test is made in a block 133 to determine if the nearest airport option has been selected. If selected (due to key 6R having been actuated), the program cycles to block 112. If the nearest airport option has not been selected, a test is made in a block 134 to determine if the pilot has ended the alternate destination predictor program. If so, the program ends at block 140. If the pilot has not ended the program, the program cycles to block 122, whereat a test is made to determine if the DIRECT-TO/MISSED APP toggle key, 5L, has been actuated. Thereafter the program proceeds in the manner described above.

Figure 6:
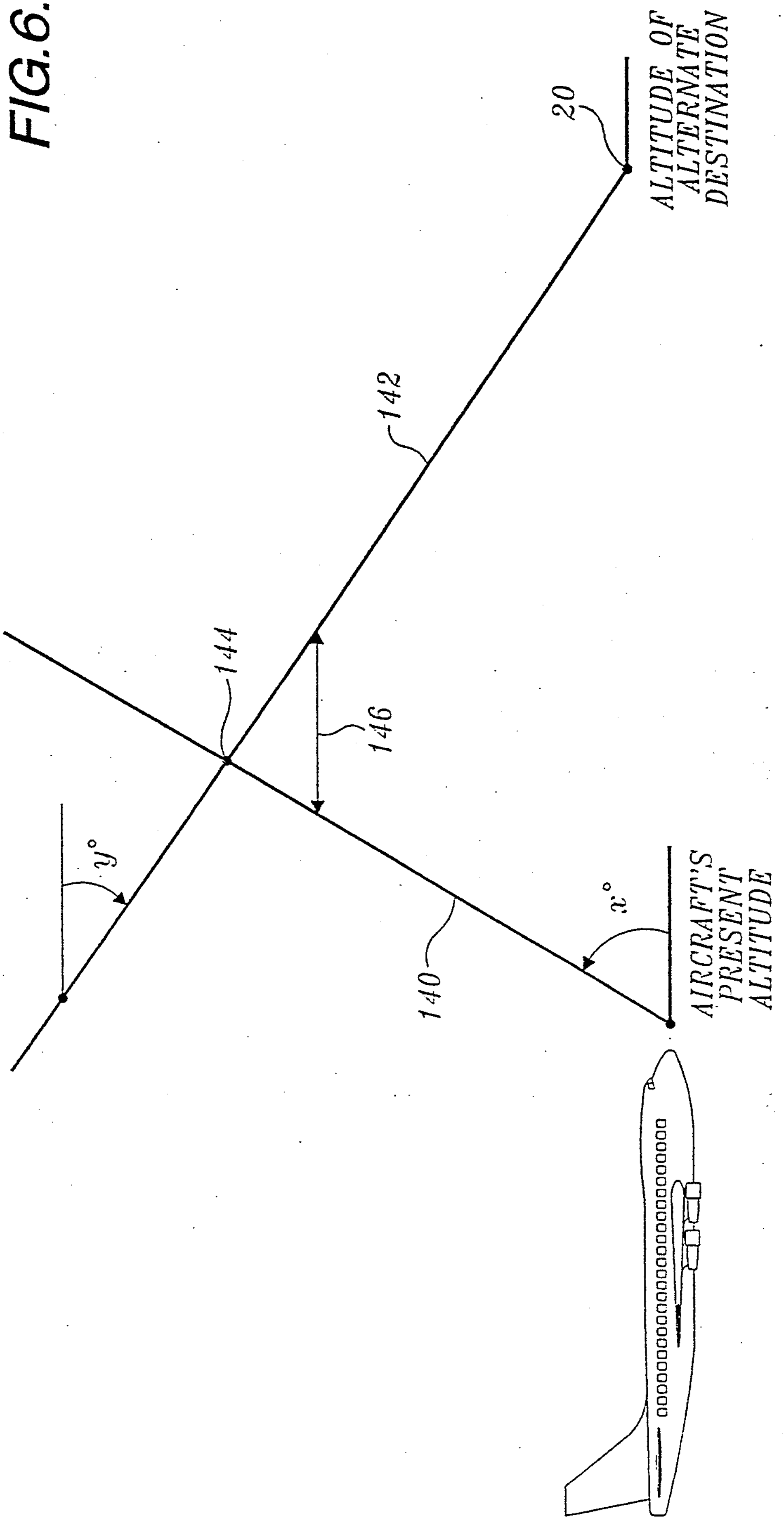
FIG. 6 is a diagram showing how a short trip optimum altitude is calculated according to the present invention.

FIG. 6 is a diagram showing how the FMC modification of the present invention calculates the trip altitude at which to fly from the aircraft's present position to the alternate destination. In FMCs commonly found on commercial aircraft, a climb angle x° and a descent angle y° can be regularly precomputed and updated based on the gross weight of the aircraft. These angles represent the optimum angles of ascent and descent based on the flight characteristics of the type of aircraft being flown for a given gross weight. After determining the present altitude of the aircraft, a climb line 140 is "constructed" by the FMC from the aircraft's present altitude using the predetermined climb angle x°. A descend line 142 is "constructed" by the FMC from the alternate destination using the predetermined descent angle y°. After the two lines 140 and 142 have been mathematically constructed, the altitude of an intersection point 144 is determined. After the altitude of the intersection point 144 has been determined, a short trip optimum altitude (STOA) is calculated by constructing a line 146 having a length equal to the minimum cruise distance of the aircraft on which the FMC is mounted. Typically, for each type of commercial aircraft, an airline specifies a default minimum cruise time that allows the aircraft sufficient time to level out before beginning to descend to a runway. For example, in a Boeing 737 aircraft, the minimum cruise time is often set to one minute. In this example, this minimum cruise time defines a minimum cruise distance. Continuing with the example shown in FIG. 6, the short trip optimum altitude (STOA) is therefore the altitude of line 146. Another function that most FMC calculate periodically is the optimum altitude of the aircraft. This optimum altitude is calculated based on the weight of the aircraft. Once these two altitudes have been computed (STOA and the optimum altitude), the lesser is chosen by the invention to be the altitude (trip altitude) at which to fly from the aircraft's present position to the alternate destination and from the last waypoint in the missed approach flight plan to the alternate destination, in the case of a missed approach. The above description assumes that, given the aircraft's present position, an intersection point 144 can be determined. It may be, however, that the aircraft is "above" line 142 and there will be no intersection point. In that case, the trip altitude is chosen as follows: for the direct approach, trip altitude is always chosen as the aircraft's present altitude; and for the missed approach case, the trip altitude is selected to be the altitude of the last waypoint in the missed approach procedure.

Figure 7:
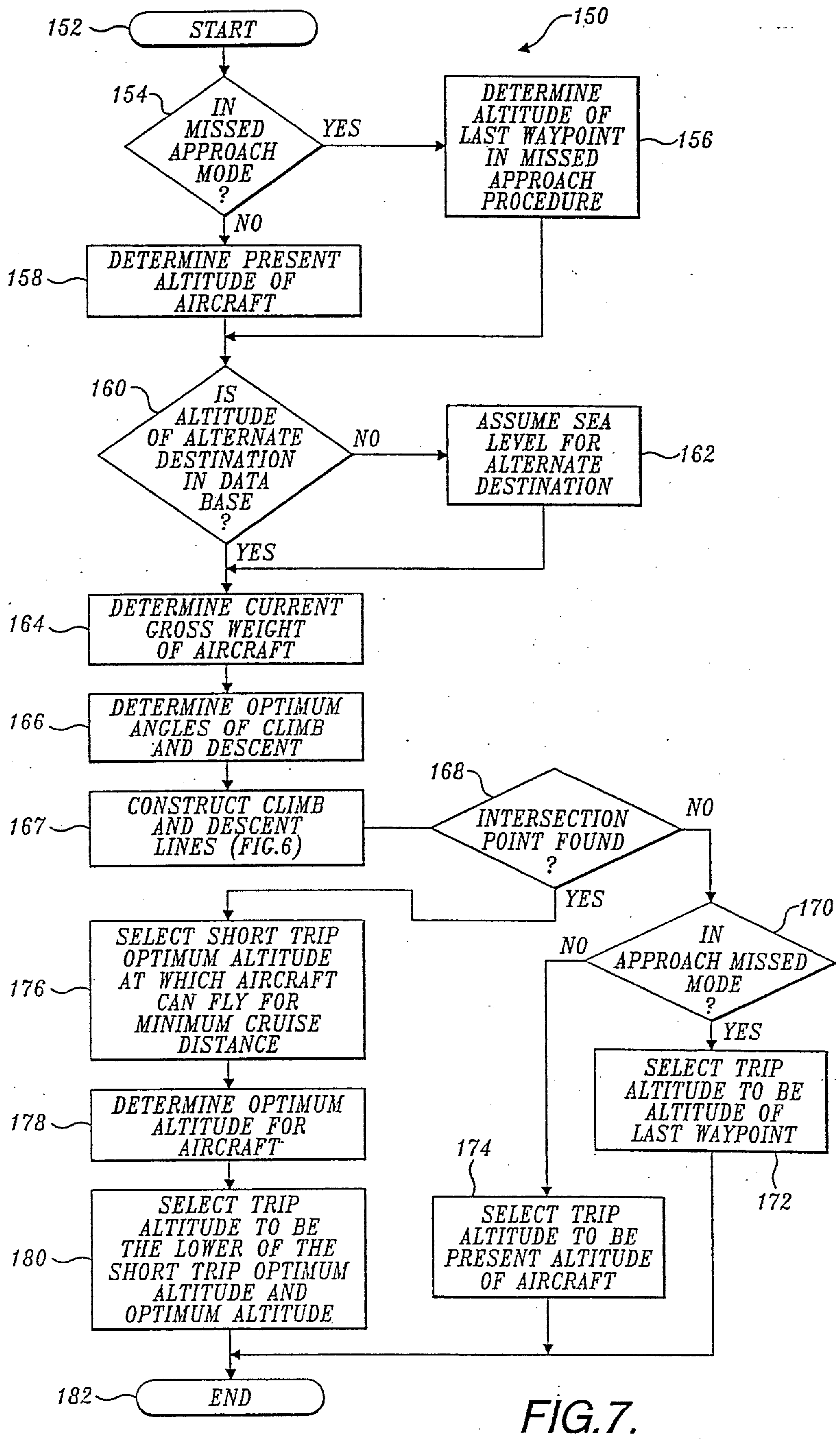
FIG. 7 is a flow chart showing how a trip altitude is calculated according to the present invention.

FIG. 7 is a flow chart showing a program 150 for carrying out the method described above for determining the trip altitude at which the pilot should fly the aircraft to an alternate destination. The program 150 begins at a start block 152 and proceeds to a decision block 154 wherein a test is made to determine if the pilot has selected the missed approach mode, i.e., if toggle key 5L is in the DIRECT-TO or MISSED APP state. If the answer to decision block 154 is yes, the program proceeds to a block 156, wherein the altitude of the last waypoint used in the missed approach procedure is determined. The altitude of the last waypoint is the altitude at which the aircraft begins flying from the intended destination to the alternate destination as shown in FIG. 1. If the answer to decision block 154 is no, the program proceeds to a block 158, wherein the present altitude of the aircraft is determined. After block 156 or 158, the program proceeds to a decision block 160 wherein the altitude of the alternate destination is determined by reading the navigational data base. If the altitude of the alternate destination is not contained within the data base, the program proceeds to a block 162, wherein the altitude of the alternate destination is conservatively set to sea level. The program then proceeds to block 164, wherein the current gross weight of the aircraft is read from the FMC memory. After block 164, the program proceeds to block 166, wherein the optimum angles of climb (x°) and descent (y°) are also read from the FMC memory. As with the gross weight, these variables are regularly precomputed and updated by the FMC and stored in memory. The climb and descent lines are next constructed using the predetermined climb and descent angles in block 167. After block 167, the program proceeds to a block 168, that determines if an intersection point can be determined. If the intersection point can be determined, the program proceeds to a block 176, wherein the short trip optimum altitude described above and shown in FIG. 6 is determined. After block 176, the program proceeds to a block 178, wherein the optimum altitude as computed by the FMC is read. As discussed above, the optimum altitude is a variable that is computed regularly by a flight management system, as is well known to those skilled in the art. In a block 180, the program selects the lower of the short trip optimum altitude and the optimum altitude determined in block 178. This altitude is stored for display as TRIP ALT and is used to compute ETA and FUEL. See screens 58 and 60 of FIG. 4.

If the intersection point of the climb and descent lines cannot be determined, the program proceeds to a block 170, wherein it is determined if the program is in the missed approach mode. If the answer to block 170 is yes, the trip altitude is selected to be the altitude of the last waypoint in the missed approach procedure in a block 172. If the answer to block 170 is no, the trip altitude is set to be the present altitude of the aircraft in a block 174. Thus, the displayed trip altitude is either the short trip optimum altitude, the normal FMC determined optimum altitude, the aircraft's present altitude or the altitude of the last waypoint. The program 150 ends at block 182.

Figure 8:
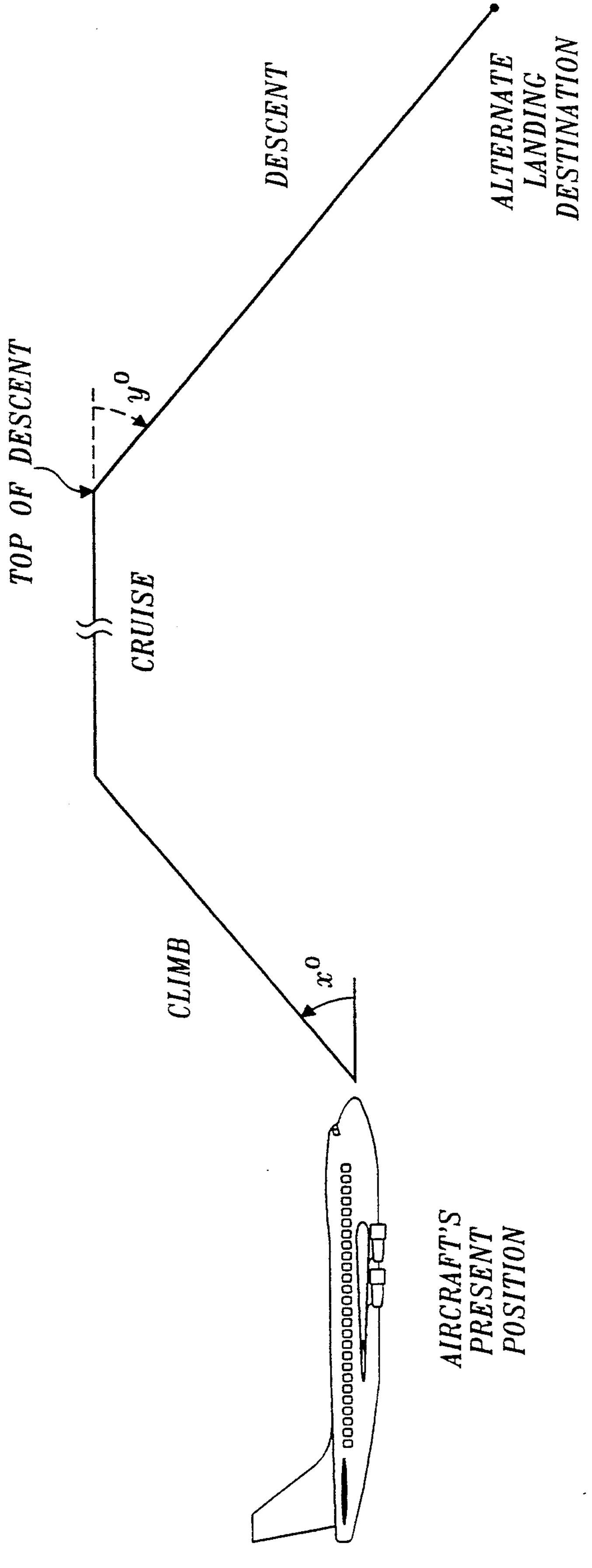
FIG. 8 is a diagram of a simplified flight profile to an alternate destination used by the present invention to determine estimated time of arrival and estimated fuel remaining upon arrival.

FIG. 8 is a diagram showing a flight plan to an alternate destination. As discussed above, the flight profile comprises a climb portion, if the aircraft is below TRIP ALT, at the predetermined climb angle x°, a cruise portion at trip altitude as calculated above and a descent portion at the predetermined descent angle y°. To calculate the estimated time of arrival and fuel remaining the FMC makes an estimate of where in the cruise segment the top of descent point is and an estimate of much fuel will remain upon landing at the alternate destination. The FMC then determines how much fuel is required to fly to the top of descent point and how much fuel is required to fly from the top of descent point to the runway at the alternate destination. If the initial estimates are correct, the amount of fuel at the top of descent point should equal the amount of fuel remaining plus the fuel used to fly from the top of descent point to the runway. If the estimates are off, the initial estimates are revised and the calculations recomputed until the amount of fuel used to fly from the aircraft's present position to the top of descent is within a predetermined value (such as 200 pounds) of the amount of fuel remaining plus the amount of fuel to fly from the top of descent to the runway at the alternate landing destination. The method for the missed approach mode is the same except that, instead of determining how much fuel is required to fly from the aircraft's present position to the top of descent point, an estimate is made of how much fuel is required to fly from the aircraft's present position, through the missed approach to the top of descent point.

Figure 9:
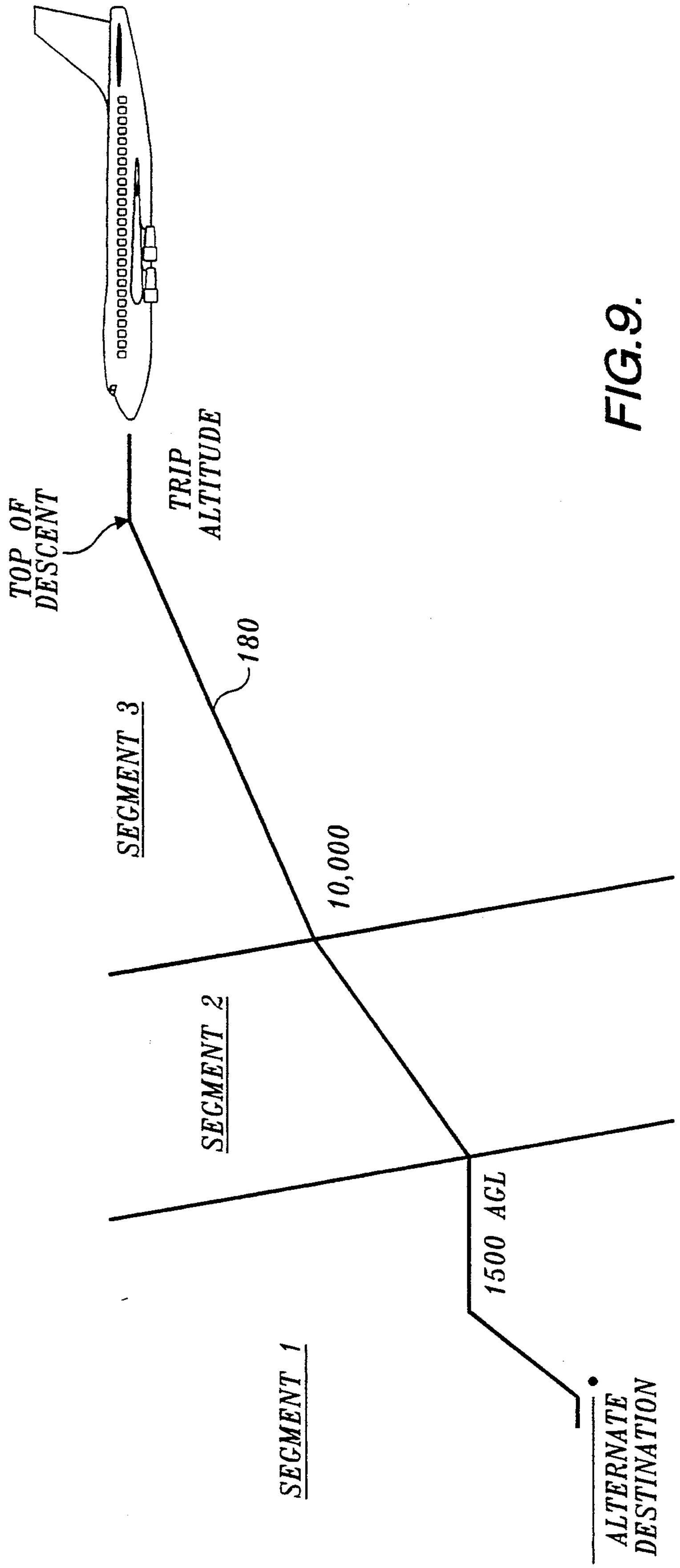
FIG. 9 is a diagram showing in more detail the descent flight profile to an alternate destination illustrated in FIG. 8.

FIG. 9 is a diagram showing in more detail the simplified descent profile 180 used by the present invention to determine the estimated time of arrival and fuel remaining for each alternate landing destination entered by the pilot or the alternate landing destinations generated by searching the navigational dam base. The time and fuel required to fly from the top of descent to the runway at the alternate landing destination is calculated backwards in three segments from the runway of the alternate destination to a top of descent point at the trip altitude. First, the distance, time and fuel required to fly from a point 1500 feet above ground level (AGL) to the runway is calculated. Secondly, the distance, time and fuel required to fly from 1500 feet AGL to 10,000 feet is calculated. Finally, the distance, time and fuel required to fly from 10,000 feet to trip altitude is calculated. The distance, time and fuel required to fly the three segments shown in FIG. 9 are determined using standard formulas for a given type of aircraft. In order that the method according to the present invention limit the amount of time required of the flight management system computer, the size of the integration steps used to compute the distance, amount of fuel used and estimated time of arrival to fly the flight plan shown in FIG. 8 are greatly increased compared to the steps normally used by the FMC. While such an increase in the size of the integration steps may be less accurate, the error is no more than one percent when compared to the calculations performed with smaller integration steps.

Figure 10:
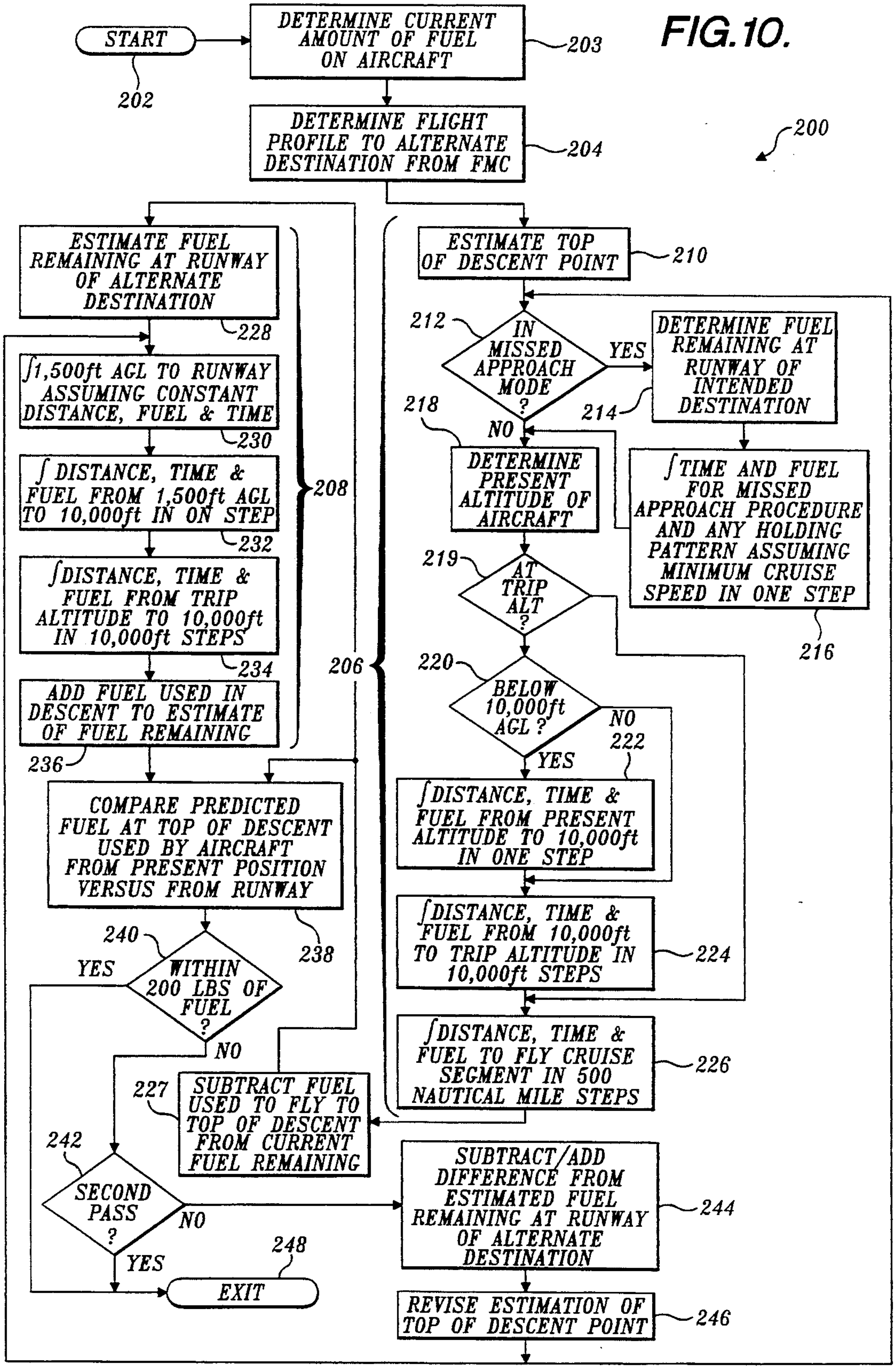
FIG. 10 is a flow chart showing how estimated time of arrival and fuel remaining for an aircraft to fly to an alternate destination are calculated according to the present invention.

FIG. 10 is a flow chart of a program 200 according to the present invention for calculating the estimated time of arrival at an alternate landing destination and the amount of fuel remaining upon arrival. The program 200 begins at a start block 202 and proceeds to a block 203 where the current amount of fuel remaining on board is retrieved. After block 203, the program proceeds to a block 204 where the profile to the alternate landing destination from the FMC such as that shown in FIGS. 8 and 9 is determined. After block 204, the program branches into two paths. The first path 206 calculates the amount of time and fuel required to fly from the aircraft's present position to the top of descent point estimated in the flight plan. The second path 208 calculates the distance, time and fuel required to fly from the estimated top of descent point to the runway at the alternate destination. The second path 208 is actually calculated in reverse order i.e., from the runway to the top of descent point using the descent profile shown in FIG. 9. The fuel amounts determined in each path, starting with the fuel on board in the first path and subtracting the amount calculated as required to reach the top of descent point and starting with the estimated amount of fuel upon arrival and adding the fuel as required to land from the top of descent point, are compared. As described above, if the estimated top of descent point and the estimated fuel remaining are reasonably correct, the amount of fuel remaining at the top of descent point, calculated in path 206, should be nearly equivalent to the amount of fuel remaining at the runway of the destination plus the amount of fuel spent flying from the top of descent point to the runway. If the estimates are not the same, the amount of fuel remaining and the top of descent point are adjusted until the calculations of paths 206 and 208 are within a predetermined threshold, such as 200 pounds of fuel.

The path 206 starts with a block 210 wherein an estimate is made of where in the flight plan the top of descent point is located. After block 210, a test is made, decision block 212, to determine if the ETA and fuel remaining are being calculated for a missed approach mode. If so, the program determines how much fuel will remain on board at the runway of the intended destination, block 214. plus how much fuel will be used to fly the missed approach procedure and make one pass around a holding pattern, block 216. If no holding pattern is included in the missed approach procedure, a conservative estimate (e.g., 10 miles) is added as the distance required to orient the aircraft for a flight to the alternate landing destination. These values are stored in the memory of the FMC. After block 216 or if the values are being calculated assuming a direct approach, the program proceeds to block 218 wherein the present altitude of the aircraft is determined. Alternatively, in the missed approach mode, the altitude is set to the altitude of the last waypoint 19. See FIG. 1.

After block 218, the program proceeds to decision block 219 whereat a test is made to determine if the present altitude of the aircraft is at trip altitude. If so, the program jumps to a block 226. If the aircraft is below trip altitude, the program proceeds to a block 220, to determine if the aircraft is below 10,000 feet. If the answer is yes, the program proceeds to a block 222 wherein the time and fuel required to fly from the aircraft's present altitude to 10,000 feet are integrated in one step. After block 222 or if the answer to decision block 220 is no, the method proceeds to block 224, wherein the time and fuel required to fly from 10,000 feet to the trip altitude calculated above are integrated in 10,000 foot increments. These values are added to the values determined in block 222, if the program cycled through block 222.

After block 224, the program proceeds to a block 226, wherein the time and fuel required to fly the length of the cruise segment to the top of descent point is determined in 500 nautical mile step integrations. These values are added to the values determined in block 224. After block 226, the program proceeds to a block 227, wherein the amount of fuel spent flying to the top of descent point is subtracted from the current fuel remaining as determined in block 203. After block 227, the program stores the distance, time and fuel calculated in path 206 and proceeds to 208.

As noted above, path 208 calculates the amount of fuel required to fly from the top of descent point in the flight profile to the runway at the alternate landing destination in reverse order and adds the calculated value to the estimated value of the fuel remaining upon landing. Beginning with block 228, an estimate is first made of the fuel remaining in the aircraft once it has landed at the alternate destination. This estimate is made by determining the time it takes to fly the descent portion of the flight plan and multiplying the time by an average rate of fuel burned and subtracting the fuel used from the estimate of the fuel on board at the top of descent point. The initial estimate of fuel can be quickly calculated by the FMC given the flight profile to the alternate destination.

After estimating the amount of fuel remaining in block 228, the program proceeds to a block 230, wherein the distance, time and fuel required to descend to the runway from 1500 feet AGL is computed using constants for the distance, time and fuel for the type of aircraft being flown. Typically, these constants are stored within the flight management system computer and can be determined by using computer predictions or accumulating test data for the particular type of aircraft. After block 230, the program proceeds to a block 232, wherein the distance, time and fuel required to descend from 10,000 feet to 1500 feet AGL is determined in one step. These values are added to the values determined in block 230. After block 232, the program proceeds to a block 234, wherein the distance, time and fuel required to descend from the top of descent point at the trip altitude to 10,000 feet are determined using 10,000 foot integration steps. These values are added to the previously determined distance, time and fuel descent values. In a block 236, the amount of fuel spent flying from the top of the descent point to the runway is added to the initial estimate of fuel remaining as calculated in the block 228.

In the block 238, the results of the fuel calculations determined in paths 206 and 208 are compared, i.e., the amount of fuel and time remaining at the estimated top of descent point (path 206) is compared with an estimate of the amount of fuel remaining on landing plus the amount of fuel required to descend from the top of descent point to the runway at the alternate destination (path 208). If the estimate of the amount of fuel remaining estimated in block 228 was correct, the current amount of fuel on board the aircraft minus the fuel spent flying to the top of descent point should equal the amount of fuel remaining plus the amount of fuel spent descending from the top of descent point to the runway at the alternate destination.

After block 238, the program proceeds to decision block 240, wherein a test is made to determine if the differences in the amount of fuel used calculated in paths 206 and 208 are within a predetermined range, such as two hundred pounds of fuel. If the answer to decision block 240 is yes, the estimate of the amount of fuel remaining in block 228 is considered accurate enough and the program 200 exits at block 248. If the answer to decision block 240 is no, the program proceeds to decision block 242 wherein a test is made to determine if the method 200 has been performed two times. If the answer to decision block 242 is no, then the method proceeds to block 244, wherein the difference between the amount of fuel used computed in paths 206 and 208 is subtracted or added from the initial estimate of fuel remaining that was calculated in block 228. After block 244, the method proceeds to a block 246 and a new estimate is made of the location of the top of descent point. After block 238 the program cycles back to paths 206 and 208. Path 206 is entered between blocks 210 and 212 and path 208 is entered between blocks 228 and 230. The recalculation is only performed once. Thus, if during the second path the results compared in decision block 240 are still not within two hundred pounds, the answer to decision block 242 is yes, resulting in the program cycling to block 248.

While the amount of time and fuel required to fly an aircraft from one location to another are typically calculated by the FMC system and are unique to the type of aircraft being flown, these calculations are typically very time consuming and, thus, slow. More specifically, in a normal FMC system the estimated time of arrival and fuel remaining predictions are performed using integration increments in the range of 1,000–1,500 feet steps of altitude for the climb and descent portions of the flight profile and integrations steps of 50 nautical miles for the cruise segment. As discussed above, in accordance with this invention, these integration increments are substantially increased. Increasing the integration steps decreases the amount of computer time required to make the predictions without significantly decreasing accuracy. In practice, the large integration steps have little effect on the accuracy of the estimated time of arrival and fuel remaining because the aircraft is typically flying at a constant speed while climbing and the aircraft's engines are idling when descending. Therefore, the calculations are relatively unaffected by large integration steps. More specifically, while the loss in accuracy may be unacceptable for a normal flight, it is acceptable where, as here, speed of calculation and, thus, display is more important than the accuracy of the result. That is, speed of display is more important than accuracy of result when a pilot is required to decide to deviate from normal flight path to an alternate landing site due to an emergency.

Figure 11:
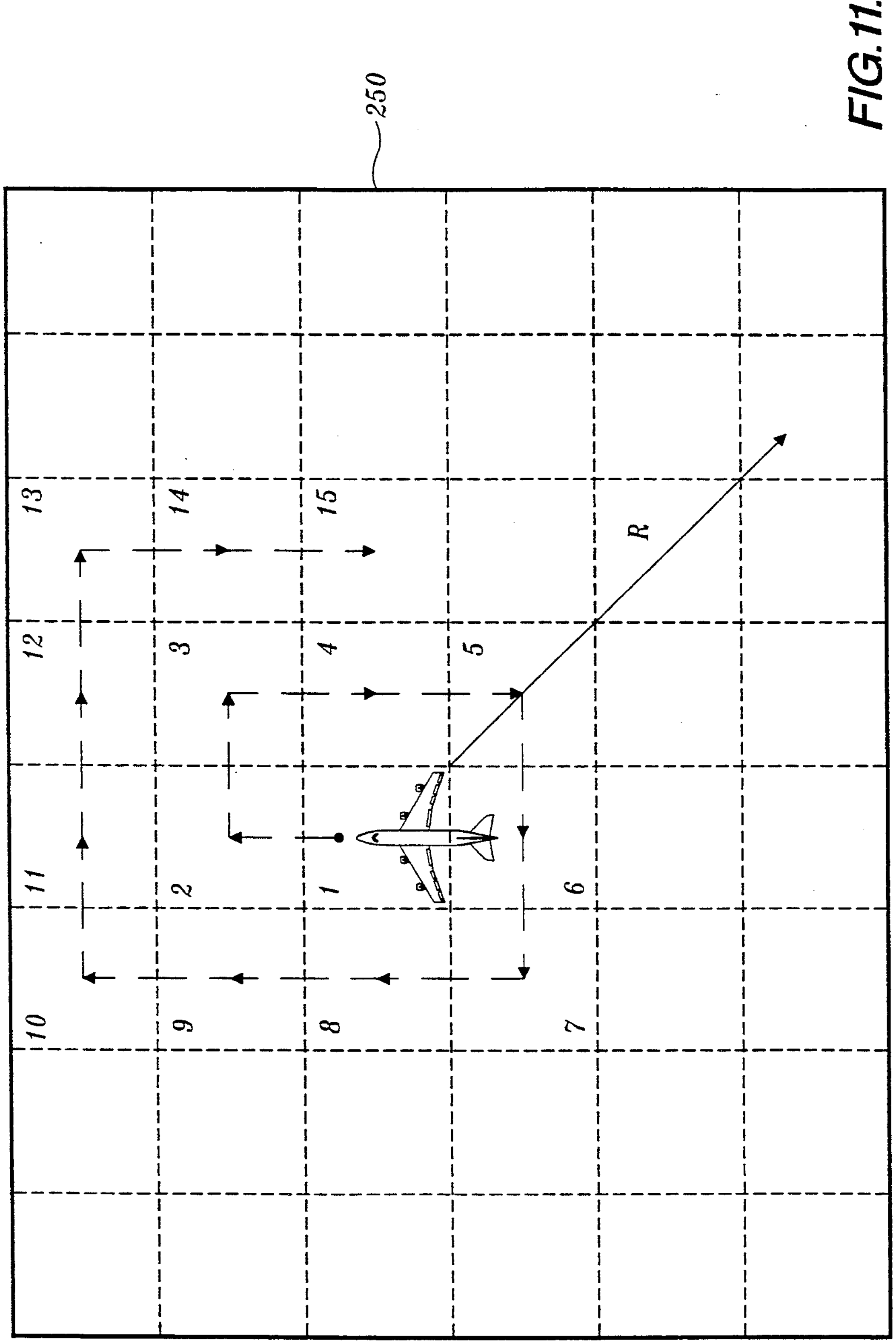
FIG. 11 is a diagram showing how the flight management computer (FMC) system modification of the present invention searches a navigational data base to determine the series of airports nearest an aircraft's present position.

FIG. 11 shows a diagram of a method of searching a navigational data base within the FMC to determine the location of alternate landing destinations nearest the aircraft's present position. As described above, the present invention allows a pilot to select the nearest airport option on the CDU, which provides a list of alternate destinations at which he can land the aircraft. The FMC navigational data base 250 is graphically depicted as divided into a series of quadrants. Typically, the navigational data base contains the latitude, longitude and elevation of all major airports and landing sites over the territory in which the aircraft is flying. Upon selecting the nearest airports option, the data base is searched in a spiral fashion from a quadrant 1, where the aircraft is presently flying, outwards through quadrants 2, 3, 4 . . . 15 until a predetermined number (e.g., five) of alternate landing destinations have been located. The spiral search will continue outward until the predetermined number of alternate landing destinations have been found or until the radial distance R of the airports located exceeds the distance the aircraft can fly given the current amount of fuel remaining. Care must be taken when searching for landing sites in the navigational data base that only those landing sites having the facilities to land the aircraft are selected. Such criteria often includes the length of the runways and emergency facilities such as firefighting or medical treatment centers. As will be apparent to those skilled in the art, the navigational data base stored in the FMC can be constructed to only include airports having a minimum runway length or emergency facilities available, depending on the airline's needs. Once the alternate landing destinations have been found by searching the navigational data base, the present system operates to determine the distance to go, trip altitude, estimated time of arrival and fuel remaining for each alternate landing destination, assuming both a direct approach or a missed approach at the intended destination as described above.

While a preferred embodiment of the invention has been illustrated and described, it will be appreciated that various changes can be made therein without departing from the spirit and scope of the invention. Therefore it is intended that the scope be determined solely from the following claims.

The embodiments of the invention in which an exclusive property or privilege is claimed are defined as follows:

1. A method of providing a pilot of an aircraft with information regarding a plurality of alternate landing destinations where the aircraft can be landed, comprising the steps of:

searching a navigational database for locations of alternate landing destinations nearest the aircraft's present position, said nearest alternate landing destinations forming said plurality of alternate landing destinations;

determining a distance between the aircraft's present position and the position of each of the alternate landing destinations;

determining a flight plan from the aircraft's present position to each of the alternate landing destinations, the flight plan including a trip altitude at which to fly to each of the alternate landing destinations, an optimum climb angle to the trip altitude, a cruise segment at the trip altitude and an optimum descent angle from the trip altitude to the alternate landing destinations;

determining the time of arrival to fly to each of the alternate landing destinations; and determining an amount of fuel remaining on the aircraft if the aircraft were to land at each of the alternate destinations by performing the steps of:

estimating a top of descent point in the flight plan to the alternate landing destination;

determining an amount of fuel required to fly from the aircraft's present position to the top of descent point in the flight plan;

determining an estimate of the amount of fuel remaining on board the aircraft at the alternate landing destination;

performing a forward determination an amount of fuel remaining at the top of descent point by determining the amount of fuel required to fly the present position of the aircraft to the estimated top of descent point;

performing a backward determination of the amount of fuel remaining at the top of descent point by determining an amount of fuel required to fly from the top of descent point to the alternate landing destination plus the initial estimate of fuel remaining at the alternate landing destination;

comparing the amount of fuel remaining at the top of descent point calculated by the forward and backward determination; and revising the estimate of the top of descent point and fuel remaining at the alternate landing destination as a result of the comparison;

displaying the alternate landing destinations to the pilot, as well as the distance to each of the alternate landing destinations, the estimated time of arrival at each of the alternate destinations, and the amount of fuel remaining if the aircraft were flown from its present position to each of the alternate landing destinations.

2. The method of claim 1, wherein said plurality of alternate landing destinations are entered by the pilot.

3. The method of claim 1, wherein the steps of determining the distance, trip altitude, time of arrival, and amount of fuel remaining are performed assuming a direct route from the aircraft's present position to each of alternate landing destinations.

4. The method of claim 3, wherein the distance, time of arrival and fuel remaining for each alternate landing destination are displayed on a control display unit.

5. The method of claim 1, wherein the steps of determining the distance, trip altitude, time of arrival, and the amount of fuel remaining are performed assuming a missed approach at an intended destination airport and a route from the intended destination to each of the alternate landing destinations.

6. The method of claim 5, wherein the distance, time of arrival and fuel remaining for each alternate landing destination that are calculated assuming a missed approach are displayed on a control display unit.

7. The method of claim 1, wherein the step of performing a forward determination of the amount of fuel remaining at the top of descent point comprises the steps of:

determining a present altitude of the aircraft; and integrating a function that determines the amount of fuel used by the aircraft to fly from the present altitude of the aircraft to the trip altitude in approximately 10,000 foot steps; and integrating a function that determines an amount of fuel used by the aircraft to fly the cruise segment to the estimated top of descent point.

8. The method of claim 1, wherein the step of performing a backward determination of the amount of fuel remaining at the top of descent point comprises the steps of:

integrating a function that determines an amount of fuel used by the aircraft to fly from the estimated top of descent point to approximately 10,000 feet, wherein said integration is performed in steps of approximately 10,000 feet; and integrating a function that determines an amount of fuel used by the aircraft to fly from approximately 10,000 feet to 1,500 feet AGL in one step; and integrating a function that determines an amount of fuel used by the aircraft to fly from 1,500 feet AGL to the alternate landing destination in one step.

* * * * *